United States Patent [19]

Iida et al.

[11] Patent Number: 5,004,857
[45] Date of Patent: Apr. 2, 1991

[54] METHOD FOR CONTINUOUSLY PRODUCING LOW MOLECULAR WEIGHT POLYMER OF CONJUGATED DIOLEFIN

[75] Inventors: Shoji Iida; Kazuo Miyazaki, both of Yokohama; Nobuyuki Takizawa, Yokosuka, all of Japan

[73] Assignee: Nippon Petrochemicals Company, Limited, Japan

[21] Appl. No.: 267,508

[22] Filed: Nov. 3, 1988

[30] Foreign Application Priority Data

Jun. 11, 1987 [JP] Japan .................. 62-281597

[51] Int. Cl.$^5$ .................................. C07C 2/02
[52] U.S. Cl. .................................. 585/507; 585/502; 585/516; 585/520
[58] Field of Search .................. 585/502, 507, 516, 520

[56] References Cited

U.S. PATENT DOCUMENTS

| | | | |
|---|---|---|---|
| 3,306,949 | 2/1967 | Mertzweiller et al. | 585/507 |
| 3,324,191 | 6/1967 | Woffard | 585/507 |
| 3,789,090 | 1/1974 | Otsuki et al. | 585/507 |
| 4,313,019 | 1/1982 | Hara et al. | 585/507 |
| 4,331,823 | 5/1982 | Wieder et al. | 585/507 |

FOREIGN PATENT DOCUMENTS 2020670  11/1979  United Kingdom ............... 585/507

*Primary Examiner*—Patrick P. Garvin
*Assistant Examiner*—E. D. Irzinski
*Attorney, Agent, or Firm*—Scully, Scott, Murphy & Presser

[57] ABSTRACT

A method for continuously producing a liquid low molecular weight polymer of conjugated diolefin having a number average molecular weight of 300 to 10000. The method comprises the step of continuously polymerizing or copolymerizing conjugated diolefin in an inert hydrocarbon solvent at a temperature of 40° to 70° C. with maintaining the quantity of dissolved oxygen in the reaction system at 1 ppm or below and in the presence of a polymerization catalyst of an organic sodium compound and a chain transfer agent of an alkylaryl compound.

5 Claims, 2 Drawing Sheets

Elution Time (min.)

Elution Time (min.)

METHOD FOR CONTINUOUSLY PRODUCING LOW MOLECULAR WEIGHT POLYMER OF CONJUGATED DIOLEFIN

BACKGROUND OF THE INVENTION (1) Field of the Invention

This invention relates to a method for continuously producing a low molecular weight polymer of conjugated diolefin. More particularly, the invention relates to a method for continuously producing a liquid low molecular weight polymer of conjugated diolefin by continuously polymerizing conjugated diolefin with maintaining a polymerization system in a substantially oxygen-free state.

(2) Description of the Prior Art

It is well know in the conventional art that a polymer of a relatively lower polymerization degree is produced by polymerizing diolefin using an organic sodium compound as a polymerization catalyst and an alkylaryl compound as a chain transfer agent.

For example, U.S. Pat. No. 3,789,090 discloses that butadiene is polymerized to produce a low molecular weight polymer. All instances on polymerization as well as those in examples disclosed in this reference are carried out by batch operation.

Furthermore, in U.S. Pat. No. 4,313,019, it is disclosed that butadiene is polymerized in the presence of an oxygen-treated catalyst. In this reference, it is described that polymerization is done continuously. However, in examples of this reference, what is called continual batch operation, i.e., the repetition of batch operation is done. That is, the polymerization is nothing but batch-wise operation.

The inventors of this application tried the methods of the above two references to polymerize butadiene continuously. As a result, the molecular weight of polymer could be well regulated reproducibly, however, the inside wall surface of reaction vessel was fouled and the lack of cooling of the reaction vessel was caused to occur.

That is, the polymerization of butadiene was carried out repeatedly according to the method of U.S. Pat. No. 3,789,090. As a result, a low molecular weight polymer of well regulated molecular weight, that is, those having sharp molecular weight distribution could be obtained but the inside wall surface of reaction vessel was fouled causing the lack of cooling of the reaction vessel.

Furthermore, the polymerization of butadiene was carried out according to the method of U.S. Pat. No. 4 313 019 using a polymerization catalyst which was treated and reacted with oxygen. As a result, a low molecular weight polymer of well regulated molecular weight could be obtained but the inside wall of reaction vessel was fouled more seriously.

At present, the mechanism that the inside wall of reaction vessel is fouled with dirt has never been made clear. Anyway, the substance of the dirt is the polymer of butadiene. This dirt substance is a polymer which cannot be dissolved by ordinary organic solvents, much less hydrocarbon solvents. Furthermore, the dirt substance is not a simple gel. In other words, the dirt substance is not the aimed low molecular weight polymer of butadiene. This dirt substance grows fast to the inside wall of reaction vessel and outer surface of an inner coil for cooling to inhibit the heat transfer through the wall of reaction vessel and the surface of an inner coil, which causes the lack of cooling. The lack of cooling in a reaction vessel brings about the rise of reaction temperature and, as a result, it gives serious influences upon the degree of polymerization, the hue of aimed product and so forth.

In the foregoing prior art reference, the dirt substance of this kind is not referred to, therefore, any countermeasure to the problem on this dirt substance is neither disclosed nor suggested.

Incidentally, with regard to several kinds of materials used for the reaction, especially, on the solvents which are used in large quantities and a chain transfer agent, any measure to avoid the dissolution of oxygen into these materials during storage and transportation is not generally taken. Accordingly, when aromatic hydrocarbon solvents such as benzene and toluene are used for polymerization, oxygen on a maximum level (several tens of ppm) is often dissolved in these solvents.

However, in the methods as disclosed in the foregoing patent publications to produce the low molecular weight polymer of butadiene, no attention was paid to the influences of oxygen in polymerization process except for catalysts. So that, solvents are generally used without any operation to eliminate oxygen, for example, by positively displacing oxygen with nitrogen.

BRIEF SUMMARY OF THE INVENTION

It is, therefore, the primary object of the present invention to provide a method for avoiding the above-mentioned disadvantages in the conventional art.

Another object of the present invention is to provide an improved method for continuously producing a liquid low molecular weight polymer of conjugated diolefin.

In accordance with the present invention, the method for continuously producing a liquid low molecular weight polymer of conjugated diolefin is characterized in that conjugated diolefin is continuously polymerized or copolymerized in an inert hydrocarbon solvent at a temperature within a range of 40° to 70° C. with maintaining dissolved oxygen in the polymerization system at 1 ppm or below and in the presence of a polymerization catalyst of an organic sodium compound represented by the following general formula (I):

wherein Ar is an aryl group, $R_1$ and $R_2$ are the same or different and each of them is a hydrogen atom or an alkyl group having 1 to 20 carbon atoms and a chain transfer agent of an alkylaryl compound represented by the following general formula (II):

wherein Ar is an aryl group, $R_3$ and $R_4$ are the same or different and each of them is a hydrogen atom or an alkyl group having 1 to 20 carbon atoms, thereby continuously producing a low molecular weight polymer of conjugated diolefin having a number average molecular weight of 300 to 10000.

BRIEF DESCRIPTION OF THE DRAWINGS

These and other objects and features of the present invention will become more apparent from the following description and preferred examples taken in connection with the accompanying drawings, in which.

DETAILED DESCRIPTION OF THE INVENTION

Figure 1:
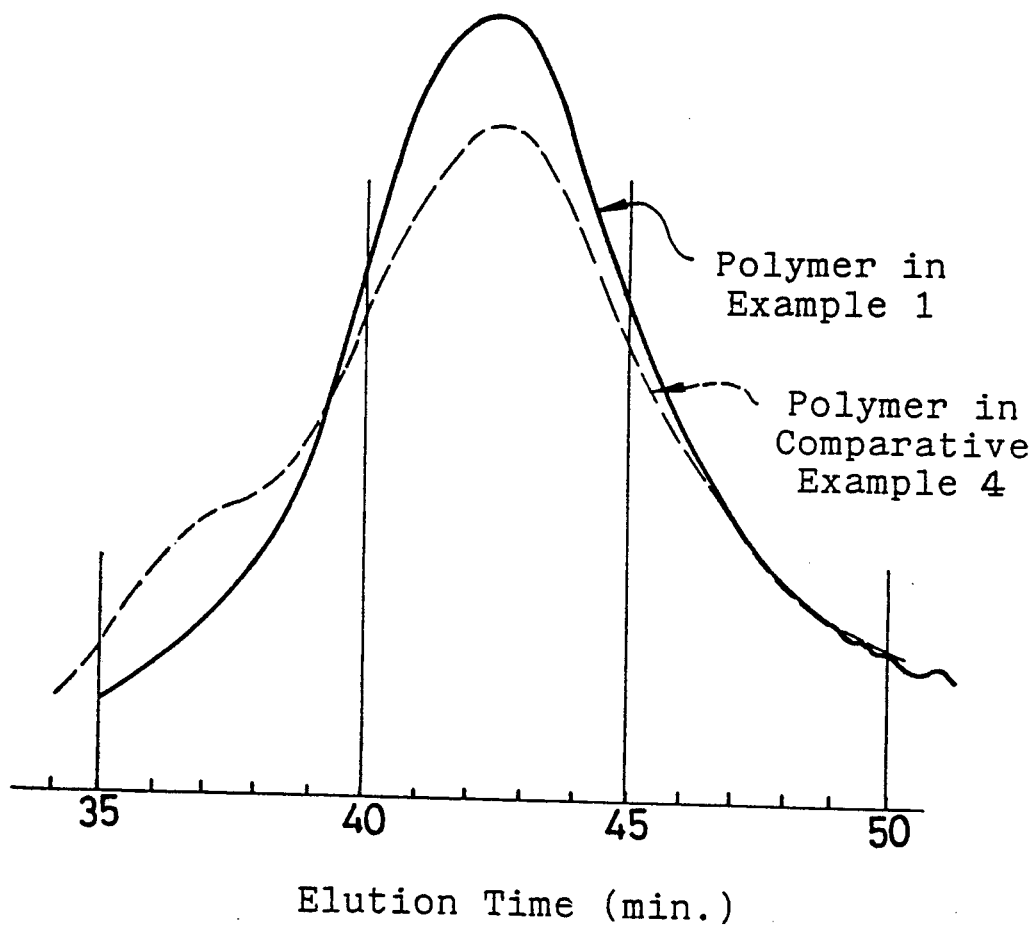
FIG. 1 is a G.P.C. chart (molecular weight distribution) of low molecular weight polymers obtained in Example 1 and Comparative Example 4.

The method of the present invention will be described in more detail.

In accordance with the method of the present invention, it is necessary that polymerization is carried out with maintaining dissolved oxygen in the polymerization system at 1 ppm or below. In the methods of batch operation disclosed in the foregoing patent publications, the existence of dissolved oxygen cannot be avoided. Especially, the severe condition that dissolved oxygen is below the level of 1 ppm in the present invention is substantially impossible in the batch operation as described in the foregoing patent publications. In other words, even when the batch reaction is carried out in a nitrogen atmosphere, it cannot be avoided that a small quantity of oxygen is mixed into or dissolved into polymerization solvent and chain transfer agent. For this reason, the practice of polymerization without the existence of oxygen is quite impossible. In addition, the mixing and dissolving of oxygen cannot be avoided in the change over of batches and other operations. Accordingly, the particular method of the present invention cannot be taught by these prior art references because such a severe condition of 1 ppm of oxygen is not attained in these methods of the references.

Because of the severe condition of 1 ppm of dissolved oxygen and in order to exclude the oxygen from the reaction system, the polymerization of the present invention is carried out by continuous operation. As described already, the methods of the two prior art references are carried out by batch operation in which oxygen is liable to be dissolved.

In order to reduce the quantity of dissolved oxygen in the polymerization system to 1 ppm or below, hydrocarbon solvent, monomer and chain transfer agent to be fed into the polymerization system are previously refined by distillation, oxygen adsorption or displacement with an inert gas such as nitrogen gas. This value of 1 ppm which is substantially a non-oxygen condition, is quite severe and it is not always easy to be attained. Therefore, the operation to remove oxygen must be carried out carefully and sufficiently. In addition, the materials obtained by the oxygen removal must be handled with keeping them from the air in storage and transportation. Even when they are exposed to the air, it is necessary to prevent oxygen from dissolving again into these materials so as to restrain the content of oxygen below 1 ppm.

The polymerization catalyst of an organic sodium compound used in the present invention is represented by the following general formula (I):

wherein Ar is an aryl group, $R_1$ and $R_2$ are the same or different and each of them is a hydrogen atom or an alkyl group having 1 to 20 carbon atoms.

The above aryl group is exemplified by phenyl, alkylphenyl and biphenyl. More particularly, the organic sodium compound is exemplified by benzylsodium, biphenylmethylsodium and the like.

The polymerization catalyst of the present invention can be easily prepared by transmetallation of an alkylaryl compound represented by the following general formula:

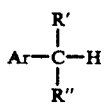

wherein Ar is an aryl group, R' and R" are the same or different and each of them is a hydrogen atom or an alkyl group having 1 to 20 carbon atoms,
with an organic sodium compound represented by the general formula:

RNa wherein R is a hydrogen atom or an organic residual group having 1 to 20 carbon atoms such as an alkyl group or an aryl group.

The organic sodium represented by RNa can be easily prepared from alkyl chloride and sodium dispersion as described in the following examples. The temperature of this reaction is not restricted and, even though it is possible to carry out the reaction at ordinary temperatures in the range of 25° to 30° C., the reaction under heated condition at 80° C. is also possible.

As disclosed in the foregoing U.S. Pat. No. 4,313,019, the polymerization catalyst which is previously treated and reacted with oxygen can also be used as far as it does not increase the quantity of dissolved oxygen in the polymerization system.

The chain transfer agent is an alkylaryl compound represented by the following general formula (II):

wherein Ar is an aryl group, $R_3$ and $R_4$ are the same or different and each of them is a hydrogen atom or an alkyl group having 1 to 20 carbon atoms.

More particularly, it is exemplified by toluene, xylene, ethylbenzene, cumene, mesitylene and durene.

As the inert hydrocarbon solvents which are used for polymerization of the present invention, the preferable ones are benzene, and pentane, hexane, heptane, octane, decane and cyclohexane. Alkylaryl hydrocarbons such as toluene are generally not preferable because they act as chain transfer agents. Furthermore, higher hydrocarbons are not preferable either because they are too high in boiling points and the separation of them after polymerization is not easy.

The conjugated diolefins used as monomers in the present invention are those having 4 to 10 carbon atoms. For example, there are butadiene, isoprene, piperylene and 2,3-dimethyl-1,3-butadiene. Furthermore, it is possible to use vinyl monomers having anion polymerization activity such as styrene and α-methylstyrene, as co-monomers.

The polymerization is carried out at a temperature in the range of 40° to 70° C. When the temperature of polymerization is lower than the above range, it is not desirable for industrial production because the rate of polymerization is low and dirt substances are liable to be formed in the reaction vessel, and as a result, the reaction can be hardly continued for a long period of time.

If the reaction temperature is higher than this range to the contrary, it is not desirable in that the yellowing of aimed polymerization product is caused to occur and the range of distribution of molecular weights becomes large, that is, the molecular weight distribution becomes broad. Even when the polymerization temperature is within the above range, if the quantity of dissolved oxygen exceeds 1 ppm, the fouling in the reaction vessel increases seriously and a long term operation is not possible. Therefore, it is inevitable in the present invention that the quantity of dissolved oxygen is 1 ppm or below.

The pressure for polymerization is not especially limited, however, in order to carry out the polymerization in a liquid phase, it is desirable that the polymerization is done under its autogenous pressure or raised pressure.

The method of the present invention is preferably carried out with predetermined concentrations of the polymerization catalyst, chain transfer agent and monomer. For example, preferable range of the polymerization catalyst is 0.01 to 0.5 mole/lit.; chain transfer agent, 0.001 to 3.0 mole/lit.; and monomer, 5 to 600 g/lit.

The molecular weight of obtained polymer (degree of polymerization) is varied according to the quantities of these three kinds of components in the polymerization system. Of course, other polymerization conditions such as the temperature of polymerization have influences upon the polymerization degree. However, in order to prepare a light-colored liquid low molecular weight polymer of 300 to 10000, preferably 500 to 5000, in number average molecular weight, the concentrations of the polymerization catalyst, chain transfer agent and monomer are preferably maintained within the above ranges.

When the concentration of polymerization catalyst is lower than 0.01 mole/lit., the molecular weight of obtained polymer is too large, so that a polymer having an aimed molecular weight cannot be prepared and the yield is lowered, which is not advantageous as a method for industrial production. On the other hand, when the concentration of polymerization catalyst is higher than 0.5 mole/lit., the molecular weight of obtained polymer is too low and the temperature rise in reaction is intense. As a result, there occurs not only the difficulty in temperature regulation but also the industrial disadvantage in the use of a large quantity of catalyst. When the concentration of the chain transfer agent is lower than 0.001 mole/lit., it is difficult to carry out sufficient chain transfer reaction and much polymers of very high molecular weights are undesirably produced. When the chain transfer agent is used more than 3.0 mole/lit., it is not desirable that polymers of very low molecular weights are produced because of the occurrence of frequent chain transfer reaction. Furthermore, in the case that the concentration of monomer is lower than 5 g/lit., the molecular weight of obtained polymer is too low and the yield of the polymer is also low, which are undesirable in view of industrial production. On the other hand, when the concentration of monomer is higher than 600 g/lit., the polymer of considerably higher molecular weight is formed and the viscosity of the obtained product increases to make the regulation of temperature difficult.

After the polymerization, the polymer of the present invention can be obtained by deactivating the polymerization catalyst by an ordinary method and recovering the aimed low molecular weight polymer of conjugated diolefin with an appropriate separation method such as distillation or the like.

As described above, according to the method of the present invention, it is possible to eliminate the fouling on the inside wall of reaction vessel, which has been impossible in the conventional art. Therefore, a long term continuous operation could be made possible without suffering from the lack of cooling of reaction vessel owing to the adhered dirt substances. In addition, it is also possible to produce a light-colored liquid low molecular weight polymer of conjugated diolefin with good reproducibility.

In the following, the method of the present invention is described in more detail with reference to several examples.

EXAMPLE 1

Because the quantity of dissolved oxygen in commercially obtained benzene and toluene was about 40 ppm, the dissolved oxygen was reduced by distillation to less than 1 ppm. Butadiene and chlorobenzene were also subjected to distillation. After distillation, benzene and toluene were stored under nitrogen sealing. During the transferring of these materials from storage tanks to a reaction vessel, they were also kept apart from the air. The determination of dissolved oxygen was carried out with a closed-type testing apparatus using galvanic cell method. Furthermore, it was completely dehydrated with silica-alumina.

To a system containing 1.5 kg of sodium dispersion, 30.4 kg of toluene and 18.1 kg of benzene was added 3.4 kg of chlorobenzene at 40° C. After that, the temperature of the mixture was raised to 80° C. and it was stirred for 2 hours to prepare a catalytic solution containing 30 moles of benzylsodium. This catalytic solution was prepared once a day and used for the continuous polymerization.

The air in a 300 lit. autoclave equipped with an inner coil, a jacket and a stirrer was replaced with nitrogen gas and the catalytic solution containing 5.6 moles of catalyst was then fed into the autoclave. Furthermore, 65.7 kg of benzene was fed and, with maintaining the temperature of the contents at 50° C., butadiene was fed at a rate of 16.8 kg/hr to continue polymerization for 4.5 hours. After that, 16.8 kg/hr of butadiene, 14.0 kg/hr of benzene, 1.25 mole/hr of catalyst and 6.3 mole/hr of toluene were continuously fed at constant rates to initiate the continuous polymerization and simultaneous discharging of polymerization product. The reaction temperature was regulated to 50° C. during the polymerization and the level of liquid contents was adjusted using a liquid level gauge to continue the polymerization. Incidentally, the quantity of dissolved oxygen in the liquid phase in the autoclave was less than 1 ppm during this continuous polymerization.

The degree of fouling of the cooling coil in the autoclave was represented by overall coefficients of heat transfer which were calculated from the temperatures and the flow rates of cooling water at its inlet and outlet and the area of heat transfer. The continuously obtained polymer product was brought into contact with an aqueous alcohol solution to stop the polymerization and the decomposition products of the catalyst were extracted into the aqueous alcohol solution. Benzene and other components were removed by using a thin film evaporator and the properties of obtained product were analyzed. The results are shown in the following Table 1.

TABLE 1

| Duration of Continuous Operation (hr) | Conversion Rate of Butadiene (%) | Number Average Molecular Weight | Hue of Polymer (Gardner) | Molecular Weight Distribution of Polymer | Overall Coeff. of Heat Transfer (kcal/ hr · m$^2$ · °C.) |
|---|---|---|---|---|---|
| 10 | 98.2 | 1950 | 1$^-$ | Narrow | 330 |
| 24 | 98.5 | 2000 | 1$^-$ | Narrow | 320 |
| 36 | 98.5 | 2000 | 1$^-$ | Narrow | 290 |
| 96 | 98.3 | 1950 | 1$^-$ | Narrow | 220 |
| 144 | 98.7 | 2050 | 1$^-$ | Narrow | 200 |
| 192 | 98.4 | 2000 | 1$^-$ | Narrow | 210 |
| 240 | 98.6 | 2050 | 1$^-$ | Narrow | 200 |
| 288 | 98.5 | 2000 | 1$^-$ | Narrow | 195 |
| 336 | 98.6 | 2000 | 1$^-$ | Narrow | 205 |
| 384 | 98.2 | 1950 | 1$^-$ | Narrow | 200 |

COMPARATIVE EXAMPLE 1

Feeding benzene, toluene and butadiene, which were obtained commercially with a lorry and were fully dissolved oxygen in, into a reaction vessel without subjecting them to the removal of oxygen like Example 1, continuous polymerization was carried out in the like manner as in Example 1 except that the quantity of dissolved oxygen in the liquid phase during the polymerization was 10 ppm. The results are shown in the following Table 2.

As will be understood from Table 2, the regulation of molecular weight was satisfactory, however, the overall coefficients of heat transfer were largely lowered with the passage of time due to the adhesion of dirt substances. After 72 hours' operation, the polymerization could not help being stopped. The obtained polymers were colored to some degree.

TABLE 2

| Duration of Continuous Operation (hr) | Conversion Rate of Butadiene (%) | Number Average Molecular Weight | Hue of Polymer (Gardner) | Molecular Weight Distribution of Polymer | Overall Coeff. of Heat Transfer (kcal/ hr · m$^2$ · °C.) |
|---|---|---|---|---|---|
| 10 | 97.2 | 1800 | 2$^-$ | Narrow | 310 |
| 15 | 97.2 | 1750 | 2$^-$ | Narrow | 290 |
| 24 | 96.8 | 1750 | 2$^-$ | Narrow | 230 |
| 36 | 97.3 | 1780 | 2$^+$ | Narrow | 200 |
| 48 | 96.9 | 1750 | 2$^-$ | Narrow | 180 |
| 60 | 97.3 | 1750 | 2$^+$ | Narrow | 165 |
| 72 | 97.0 | 1780 | 2$^+$ | Narrow | 145 |

EXAMPLE 2

Polymerization was carried out in the like manner as in Comparative Example 1 except that the quantity of dissolved oxygen was 5 ppm. The results are shown in the following Table 3.

As will be understood from Table 3, the lowering of the overall coefficient of heat transfer was retarded as compared with Comparative Example 1. However, this Comparative Example 2 was still insufficient for a long term continuous operation.

TABLE 3

| Duration of Continuous Operation (hr) | Conversion Rate of Butadiene (%) | Number Average Molecular Weight | Hue of Polymer (Gardner) | Molecular Weight Distribution of Polymer | Overall Coeff. of Heat Transfer (kcal/ hr · m$^2$ · °C.) |
|---|---|---|---|---|---|
| 10 | 97.5 | 1850 | 1$^+$ | Narrow | 310 |
| 15 | 97.8 | 1800 | 1$^+$ | Narrow | 290 |
| 24 | 97.7 | 1830 | 1$^-$ | Narrow | 270 |
| 36 | 97.5 | 1820 | 1$^+$ | Narrow | 250 |
| 48 | 97.9 | 1850 | 1$^-$ | Narrow | 230 |
| 60 | 97.6 | 1780 | 1$^+$ | Narrow | 190 |
| 72 | 97.6 | 1820 | 1$^+$ | Narrow | 180 |
| 82 | 97.8 | 1850 | 1$^-$ | Narrow | 175 |

COMPARATIVE EXAMPLE 3

Polymerization was carried out in the like manner as in Example 1 except that the temperature of continuous polymerization was 30° C. The results are shown in the following Table 4.

As will be understood form Table 4, the overall coefficient of heat transfer was lowered with the passage of time and the cooling became impossible.

Figure 2:
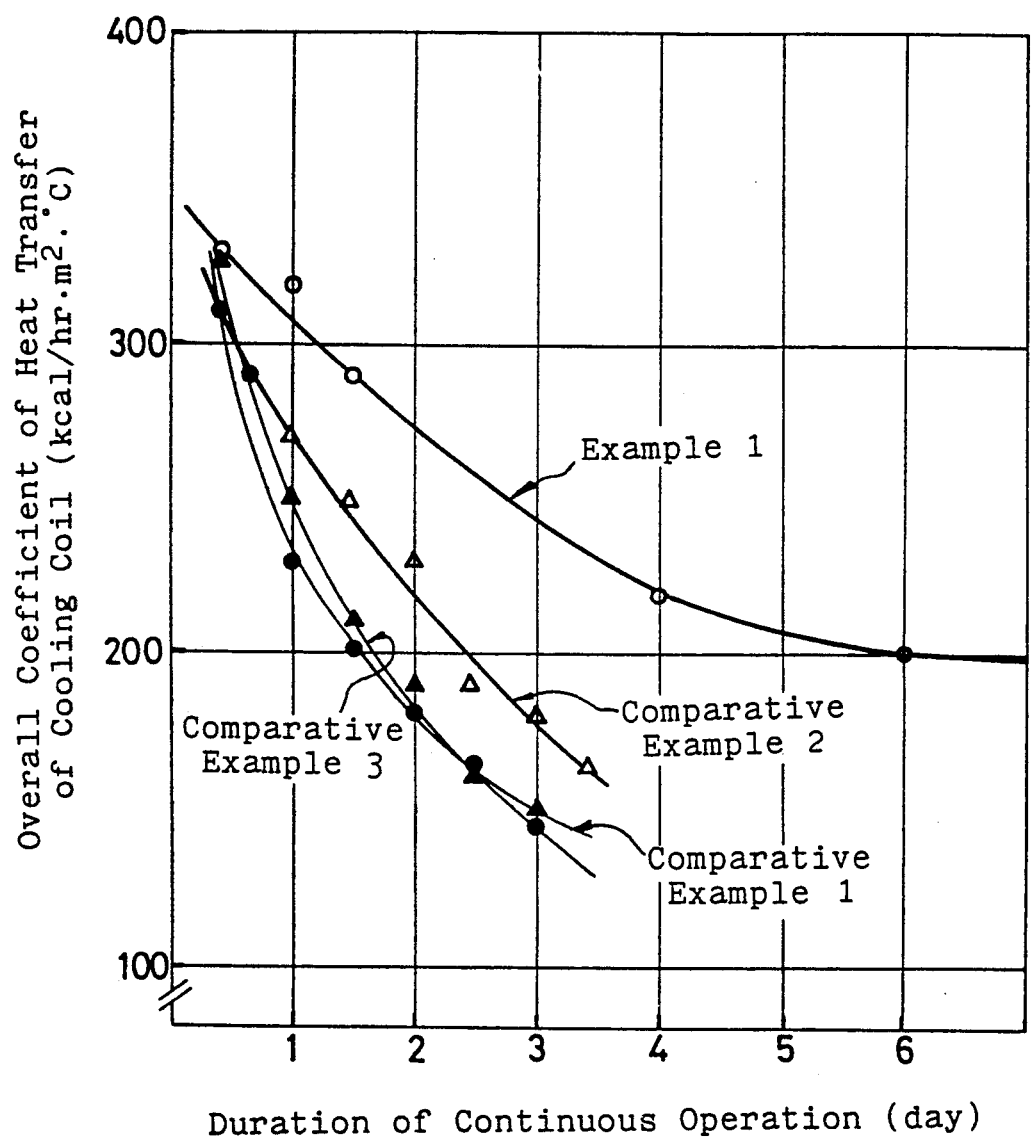
FIG. 2 is a graphic chart showing the changes in overall coefficients of heat transfer with the passage of time in Example 1 and Comparative Examples 1 to 3.

Incidentally, the changes with the passage of time in overall coefficients of heat transfer with regard to Example 1 and Comparative Examples 1 to 3 are plotted in the attached FIG. 2.

TABLE 4

| Duration of Continuous Operation (hr) | Conversion Rate of Butadiene (%) | Number Average Molecular Weight | Hue of Polymer (Gardner) | Molecular Weight Distribution of Polymer | Overall Coeff. of Heat Transfer (kcal/hr · m² · °C.) |
|---|---|---|---|---|---|
| 10 | 97.3 | 2150 | 1⁻ | Narrow | 330 |
| 15 | 97.8 | 2700 | 1⁻ | Narrow | 290 |
| 24 | 97.5 | 2050 | 1⁻ | Narrow | 250 |
| 36 | 97.2 | 1750 | 1⁻ | Narrow | 210 |
| 48 | 97.7 | 2650 | 1⁻ | Narrow | 190 |
| 60 | 97.3 | 1700 | 1⁻ | Narrow | 160 |
| 72 | 97.5 | 2100 | 1⁻ | Narrow | 150 |

COMPARATIVE EXAMPLE 4

Polymerization was carried out in the like manner as in Example 1 except that the temperature of continuous polymerization was 80° C. The results are shown in the following Table 5.

As will be understood form Table 5, the lowering in the overall coefficients of heat transfer of cooling coil was not so large, however, the coloring (yellowing) of the obtained polymer was serious. In the attached FIG. 1, the molecular weight distribution of the obtained polymer is shown together with that of Example 1, in which it is not desirable that the molecular weight distribution of higher polymer side in this Comparative Example is too wide as compared with that of Example 1.

TABLE 5

| Duration of Continuous Operation (hr) | Conversion Rate of Butadiene (%) | Number Average Molecular Weight | Hue of Polymer (Gardner) | Overall Coeff. of Heat Transfer (kcal/hr · m² · °C.) |
|---|---|---|---|---|
| 10 | 98.7 | 1700 | 4+ | 340 |
| 15 | 98.6 | 1720 | 5+ | 330 |
| 24 | 98.7 | 1750 | 5+ | 320 |

What is claimed is:

1. A method for continuously producing a liquid low molecular weight polymer of conjugated diolefin having a number average molecular weight of 300 to 10000 which method comprises the step of continuously polymerizing or copolymerizing conjugated diolefin in an inert hydrocarbon solvent at a temperature within a range of 40° to 70° C. with maintaining the quantity of dissolved oxygen in the polymerization system at 1 ppm or below and in the presence of a polymerization catalyst of an organic sodium compound represented by the following general formula (I):

wherein Ar is an aryl group, $R_1$ and $R_2$ are the same or different and each of them is a hydrogen atom or an alkyl group having 1 to 20 carbon atoms and a chain transfer agent of an alkylaryl compound represented by the following general formula (II):

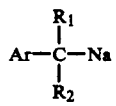

wherein Ar is an aryl group, $R_3$ and $R_4$ are the same or different and each of them is a hydrogen atom or an alkyl group having 1 to 20 carbon atoms.

2. The method for continuously producing a liquid low molecular weight polymer of conjugated diolefin in claim 1, wherein said conjugated diolefin is butadiene.

3. The method in claim 1, wherein said organic sodium compound is benzyl sodium.

4. The method in claim 1, wherein said chain transfer agent is toluene.

5. The method in claim 1, wherein the quantities of oxygen dissolved in both of said inert hydrocarbon solvent and said chain transfer agent to be fed to said polymerization system are reduced to less than 1 ppm by distillation, oxygen adsorption or displacement with an inert gas.

* * * * *

UNITED STATES PATENT AND TRADEMARK OFFICE
CERTIFICATE OF CORRECTION

PATENT NO. : 5,004,857

DATED : April 2, 1991

INVENTOR(S) : Shoji Iida, et al.

It is certified that error appears in the above-identified patent and that said Letters Patent is hereby corrected as shown below:

Column 8, line 24: "EXAMPLE 2" should read as --COMPARATIVE EXAMPLE 2--

Signed and Sealed this

Eighth Day of September, 1992

Attest:

DOUGLAS B. COMER

*Attesting Officer*       *Acting Commissioner of Patents and Trademarks*